United States Patent Office 2,767,096
Patented Oct. 16, 1956

2,767,096

METHOD OF TREATING FOOD ANIMALS

Oscar E. Schotté, Amherst, Mass., assignor of fifty-two and one-half percent to The Trustees of Amherst College, a corporation of Massachusetts No Drawing. Application December 16, 1952, Serial No. 326,343

7 Claims. (Cl. 99—107)

My present invention relates to food animals and more particularly to a process for improving the quality and food value of the meat of food animals such as cattle, goats, sheep and hogs. This application is a continuation in part of my copending United States patent application Serial No. 198,221, filed November 29, 1950.

Various methods have been heretofore proposed for injecting taste modifying substances into cattle and other food animals. One such method is described in my Patent No. 2,516,923, granted August 1, 1950. This patent dealt with the injection of melted fat into an uneviscerated animal carcass through the heart and the channels of the blood circulatory system to obtain a deposit of fat within and around the muscle bundles of the meat to secure as closely as possible the desired effect of "marbling." While the method taught by this patent is scientifically sound, various considerations have rendered desirable the fundamental changes and improvements constituting my present invention. These considerations include government regulations with respect to slaughtering procedures and economic, biological and anatomical problems to be considered more fully hereinafter.

The application of the method of my above patent necessitated a substantial departure from the generally accepted and government approved slaughtering and dressing procedures in that injection of the food stuffs into the whole animal including the viscera and the lungs produced discoloration and otherwise modified the appearance of the viscera, thus interfering with the inspection thereof which is generally made to ascertain possible pathological conditions.

As is well known, the hide, the skeleton, the meaty portions and all the viscera of an animal receive their supplies of sugar, metabolic food stuffs, hormones and oxygen through the heart by way of the aorta. From the aorta, which emerges from the left ventricle of the heart, are derived all the centrally located great arterial trunks which subdivide into smaller arteries, arterioles and finally into the capillaries which permeate intimately all the tissues of the body. Every cell of the muscular tissue receives an individual branch from one of these arterioles and is provided with a basket of fine capillaries for every individual muscle fibre. It is also well known that the returning venous system is not a separate system of channels but is a direct continuation of the arterial system. Indeed, the lumens of the venous capillaries are at first indistinguishable from the arterial capillaries and it is only when the cross sections of these vessels become larger that they acquire the structural characteristics which distinguish them from the corresponding arteries of the body. The fundamental difference in the structure of the veins is the relative absence of elastic tissue which renders them less contractile and therefore less resistant to pressure. As a further consequence of their structure, the circulation in veins is slower and more easily impeded by obstructions.

The veins from the anterior portion of the body collect the returning blood from the neck and forequarters through the large jugular and brachial system, which together with other less important veins, converge as the anterior vena cava and empty on the dorsal face of the heart into the so-called sinus venosus. The veins from the posterior portion of the body collect as femoro-iliac veins which soon converge into the important vena cava. This vena cava receives blood not only from the hindquarters and from the sacro-lumbar region, but it also collects on the return circuit a large portion of the venous blood from the bowels, via the numerous intestinal and mesenteric veins. As will be more clear from the discussion hereinafter, this latter circumstance constitutes one of the important reasons for practicing the method of the present invention. Another large portion of the venous blood from the digestive tract does not return directly into the general pool of blood via the large systemic veins but does so indirectly via the additional blood network of the liver. Indeed, the venous blood, returning from the alimentary canal, and which is charged not only with rich food stuffs but also with some waste products from the digestive tract, collects into a very large vein, termed the hepatic portal. This vein, after entering the liver, divides into smaller veins, eventually forms an additional venous capillary and departs from the liver as the hepatic vein. The hepatic vein and the vena cava join behind the right auricle with the anterior vena cava and unite within the sinus venosus.

The foregoing description of mammalian blood circulation makes it clear that it is impossible to inject a fluid into the circulatory system of one part of the body without affecting the other parts of the body because of the intimate interconnection of the venous and the arterial channels of this system since they all converge within the centrally situated heart. More particularly, when a portion of the circulatory network is filled with a fluid under pressure, additional fluid is likely to employ a circuitous route in passing from one part of the body into another. For example, it has been my experience that substances injected into a steer through the aorta at a point completely separated from the upper aorta by a transverse cut at the level of the diaphragm were seen to emerge from the open neck in spite of the removal of the viscera with all the visceral arteries and veins. It is clear that in this case the injection fluids were using circuitous channels across vast areas of firm fleshy tissue in order to reach, in the complete absence of the larger blood vessels, the region of the open neck. There is, indeed, cumulative evidence brought forth in the scientific literature of passage of considerable volumes of blood from the arterial system into the venous by direct arterio-venous connections, or shunts, which are intended to by-pass the smallest capillaries of 5 to 7 micra in diameter. Indeed, in the presence of slight obstacles, such as the pressure of one organ against another, a clot, the solidification of injection substances, etc., large volumes of blood can pass by means of arterioles 5 to 7 times larger than the capillaries into veinoles of corresponding transverse diameters.

One aspect of this vascular integration between the fleshy and the visceral portions of the body has an important bearing upon the principal object of my invention, namely improvement in the taste and quality of meat. In the case of a total injection of a non-eviscerated food animal, i. e., injection of melted fats or the like into the heart or into the aorta, the injection fluid passes through the large visceral arteries, the common coeliac, the anterior and posterior mesenteric and other arteries into the capacious mass of bowels existing within the abdominal cavity of cattle and similar food mammals. It is important to observe that the stomach, with its four divisions, comprises in grown cattle a space capable of holding from thirty to sixty gallons of material. The small intestine, with an average length of 130 feet and a diameter of about two inches, represents an additional capacity of seven to eight gallons. To these enormous volumes there must be added the volume provided by the large intestine including the colon and the rectum comprising a total length of another forty feet. In addition to these volumes, there is the sac of the greater omentum, which is formed of four layers of mesenteric sheaths and which covers the greater part of the abdominal cavity like an apron, a circumstance which increases enormously the surface area of soft flacid tissues endowed with a rich vascular network. When it is considered that there are no flat surfaces within the mucosa of the alimentary tract, but that these enormous externally visible surfaces are increased within the inner, functional side of the intestine by creases, ridges and villosities and that blood vessels encase and surround every cell of these areas, the immensity of the surface areas covered by the blood network within the abdominal cavity will be realized.

The foregoing considerations concerning the passage of vast amounts of blood over and within the different functional segments of the digestive system have a direct bearing upon the problem of injecting heated alimentary materials into a non-eviscerated food animal. The elementary physiology of digestion teaches that large amounts of volatile fatty acids are being formed within the caecum and colon of ruminants, as by-products of digestive of cellulose and carbohydrates. The lower fatty acids (butyric, valeric, caproic, caprylic and capric) produced in the large intestine are distinguished by disagreeable smells and tastes such as are characteristic of rancid butter and of old goats. The digestive gases of the large intestine are mostly eliminated directly, but it is well known that they are also absorbed in part into the blood. It is, therefore, understandable and inevitable that, when heated fatty substances pass through the enormous surfaces of the alimentary canal, of the mesenteries supporting the bowels and of the omentum covering the abdominal cavity, they acquire much of the emanations of the digestive gases; moreover, it is believed that the volatile lower fatty acids with their disagreeable odors and tastes become absorbed and dissolved within the passing fat which flows through these organs and surfaces.

There is an additional source of olfactory and gustatory deterioration of heated food stuffs which is caused by the inevitable admixture of these stuffs passing from the intestine into the liver by way of the hepatic portal system. Here again half-digestive fatty acids, fat droplets in the form of an emulsion, glycogen and other substances are apparently being collected from the inner digestive surfaces to be conveyed into the liver via this important channel. Due to the inevitable shunting of the blood vascular network, the substances passing from the gut join the regular venous system, and, in consequence of this interrelation of the arterial, venous and portal circulatory systems, it has been observed that in many cases the liver of an animal permeated with fatty substances by total injection through the heart without previous evisceration had acquired a pronounced "gutty" odor and taste.

It is not necessary that substances which have been introduced by way of the aortia via the intestinal arteries and veins into the vena cava and into the hepatic portal system should return to the heart and then become rechanneled into the aorta to reach the other, particularly the fleshy parts of the body. The above mentioned shunt passages between the arterial and venous systems provide interconnection between all parts of the blood vascular system. The shunting effects will be increased if small particles within the injection fluid, such as torn off tissue debris, are clogging up portions of the capillary network during their passage. There will be further shunting if a particular area of the body has been allowed to cool off more than others; as a result of this cooling of the flesh of the animal, the injection fluids will tend to become solidified within the capillary network, thereby resisting the passage of the liquid portions of the injection fluid. These liquid portions will be shunted off into more open and less resisting channels of the blood circulatory system. It must be emphasized that while the shunting of blood with avoidance of the capillary network is a normal physiological process, the shunting of injection fluids becomes aggravated because of the obstacles which are created during the injection process by particles conveyed into the finer channels of the circulatory system and by the unequal temperature which causes the solidification of whole areas of the body with subsequent detour of the still warm injection fluids into other areas.

The above considerations will explain why it has often been observed as an after effect of total injection in a non-eviscerated food animal that the meat of the treated animal has acquired a "gutty" taste and may occasionally have an unpleasant odor caused by the dissolution of the lower fatty acids within the melted tallow. As would be expected, more pronounced "gutty" tastes were detected within the meat of animals in which the injection itself was considered to be a perfect success. In these cases the pressure applied was sufficient to convey the injection substance over the totality of the bowels, thereby apparently causing the injection fluids to be charged with products of metabolic activities of the alimentary canal with subsequent reshunting of the now malodorous injection fluids into the edible fleshy parts of the carcass.

Thus the total injection of non-eviscerated animals, while permitting a substantially uniform and complete permeation of the fleshy parts of the injected food animal, presents the undesired result of yielding meat having objectionable odor and taste.

Another disadvantage of former methods of total injection of non-eviscerated animals is economic in character. More particularly, melted fats injected under pressure into the circulatory system of a non-eviscerated animal pass through the vast abdominal arteries into the enormous bulk of organs within the abdominal cavity and, after filling the innumerable arteries, veins and capillaries of the viscera, return through the vast system of the vena cava, the portal vein, the hepatic veins and eventually into the sinus venosus behind the heart. These channels, when filled, represent a very substantial volume. Their volume is further increased by their extensibility. Furthermore, when the injection is performed through the aorta in a non-eviscerated animal, the returning circuit passing via the right atrium into the right ventricle and from there into the pulmonary artery is apt to convey enormous masses of melted fat via the pulmonary aorta into the capacious pulmonary cavities. Finally, the walls of the vessels within the mesenteries of the gut and of the abdominal cavity are so delicate and the tissues within which they are encased are so tenuous that the breaking through of injection fluids through the walls of these vessels and escape of these fluids through the tissues of the mesenteries frequently occurs. As a consequence of this and in the absence of any visual control of the injection, vast portions of the abdominal and of the pulmonary cavities may be filled with gallons of costly food stuffs. These large amounts of injection fluids either filling the vessels of the viscera or the coelomic and pulmonary cavities constitute a considerable economic loss without the slightest benefit to the consumer. As a result of this latter condition, it has become inadvisable to apply adequate pressure to an uneviscerated carcass because of the likelihood that rupture of the abdominal and pulmonary vessels might occur. This is an important consideration in view of the fact that the operator is unable to see the extent of the injection while the whole abdominal cavity remains unopened. The operator is also unable to apply as much pressure as needed in order to fill the fleshy parts of the carcass with nutrient food stuffs in the desired amounts.

While the method of my above mentioned patent does achieve substantial fat permeation of all parts of the body, including the meaty parts, any quantitative control over the permeation is impossible while the animal is intact. It is in addition extremely difficult to judge how much pressure should be applied to the injection apparatus in order to achieve satisfactory permeation of the meat of the animal, while simultaneously controlling the rupture of vessels within the abdominal cavity and also the filling of the thoracic cavity with the totally wasted injection fluids.

The principal object of my invention has been to provide a novel and improved method for enhancing the food value and quality of the meat of food animals.

More particularly, it has been an object of the invention to provide a method of the above type which is adaptable for use with general slaughterhouse procedures and which complies with the various governmental regulations relating to the slaughtering, inspecting and processing of meat.

Another object of the invention has been to provide a method of injecting edible food substances into the circulatory system of a food animal in which permeation of the fleshy parts of the body with food stuffs which have passed over and within the organs of the digestive system is prevented.

Still another object of the invention has been to provide a food product which, while maintaining the normal aspect of meat tissue, is fattened and improved in appearance, taste and marketability.

A further object of the invention has been to provide a method of artificially fattening a food animal in which visual control of the operation is permitted.

Another object of the invention has been to provide a novel and improved process for utilizing edible waste fats, such as those derived from animals in the usual slaughtering and dressing procedure, in fattening and improving the quality of other slaughtered animals.

A feature of the invention has been the provision of a simple, practical and general method for injecting edible food substances through the channels of the arterial blood vascular system only, the returning veins of the body remaining uninjected, except for those which contribute to the vascular network of the fleshy parts of the body.

Another feature of the invention has been to utilize the aorta and the channels of the arterial system as a means for conveying a melted food stuff into the fleshy parts of an animal under considerable pressure.

Still another feature of the invention has been to prepare the animal carcass for injection by emptying all of the viscera concomitant with the removal of the great majority of the returning larger veins so as to permit control over the injection procedures.

Another feature of the invention has been the provision of particular ranges of temperature and pressure at which injection of melted fats into an animal are preferably effected to achieve substantially complete permeation without damage to the meat.

Further objects, features and advantages of the invention will be apparent from the following description.

I have discovered that by utilizing the properties of the dorsal aorta and of the main peripheral arteries, with the exclusion of the visceral arteries, it is possible to fully inject the whole fleshy carcass of the meat animal with a melted alimentary material, the injection being carried out in the absence of all but the most terminal portion of the viscera.

The method, in accordance with my invention, of treating food animals, after slaughter and while the animal is still warm, to improve the quality of the meat, comprises the steps of bleeding the animal, removing at least the portions of the viscera within the abdominal cavities from the animal with the exception of a portion of the rectum-colon, the anus, and, in females, the terminal portion of the uro-genital system, the removal of the viscera being carried out in such a manner as to protect from substantial damage the arteries supplying blood to the viscera, blocking these arteries, and introducing a melted edible fat which has a melting point above about 75° F. into a major artery of the animal, the introduction being carried out under sufficient pressure to cause the fat to infuse and permeate a substantial portion of the carcass.

The remarkable physiological properties of the main arteries result from their histological structure, chiefly from the presence, in their tunica media, of large amounts of elastic tissue. The thick layers of elastic tissue enable them not only to withstand great pressure, but also to cooperate actively in the propulsion and in the smooth distribution of fluids through the whole blood vascular network. Indeed, as fluid under pressure is forced into a main arterial trunk, only a part of the applied force actively advances the fluid through these large elastic channels. Another and considerable portion of this force expands the tubular arteries with the numerous layers of elastic tissue and thus provides an accumulation of potential energy within the walls of these arteries. When the application of external pressure is stopped, the acquired tension within the elastic walls becomes translated into kinetic energy which moves the fluid forward since, as will be described hereinafter, my method does not permit any flow back. Thus, the great arteries of the body, which emerge from the aorta, constitute, together with the aorta and independently of the activities of the heart, a regulatory system for the distribution of fluid. Of course, these fluids should be introduced into the body while the animal is not too cold and before rigor mortis has set in. I have found that after about three hours animals are generally too cold to permit satisfactory permeation. I have also found it preferable to introduce the melted fat into the circulatory system within about one hour after death. If the animal is permitted to cool off too much, or if relatively cold fluids are being injected, the elasticity of the great arteries still persists for a while, but the regulatory function in the hydraulic system represented by the proximal branches of the arterial system centered around the heart and the dorsal aorta deteriorates progressively.

The utilization of the arterial trunks as injection sites cannot take place without some changes in the generally employed procedures of dressing the carcass. However, while the changes contemplated provide a substantial improvement in the results achieved, they do not represent any fundamental departure from the traditional slaughtering procedures.

In the normal procedure for removing the contents of the thoracic cavity, the butcher generally pays no attention to that portion of the aorta, namely the ascending aorta, from which a very important system of centrally situated arteries, namely the brachio-cephalic trunk, emerges. This trunk supplies the neck, the head, and the left forequarters, while the right subclavian artery, which supplies the right forequarters, generally emerges independently. These important arteries are invariably severed and hopelessly damaged when the removal of the lungs together with the trachea, heart and the oesophagus takes place. As an inevitable result of the severance of the brachio-cephalic trunks and of the subclavian arteries during the dressing procedures, any attempt to introduce injection fluids under pressure into the anterior region of the body must end in failure.

In the pelvic region, the damages inflicted upon the circulatory system during conventional dressing procedures are also far reaching. The arteries of the pelvic region supply not only the loin and the rump muscles but also the whole of the hindquarters. Yet, during the removal of the bowels as conventionally practiced in packing plants, the terminal portion of the aorta and the external and internal iliac arteries and veins are generally severed, thereby leaving numerous channels of the blood vascular system open in such a way as to render them essentially untraceable. To locate and to ligate these vessels demands the combined knowledge of an anatomist and the skill of a surgeon. If, on the other hand, these vessels are not ligated before the injection, it is impossible to achieve the purposes of the injection since no pressure can be applied in the presence of numerous and vast open channels. As a consequence of this situation, injection of the totality of the carcass and particularly of the all important lumbar area and of the hindquarters can be effected only if a substantial portion of the rectum-colon and of the anus is preserved. In females, the vulvo-vaginal area is preferably also preserved. The preserved portion of the vulvo-vaginal area may be termed the "terminal portion of the uro-genital system." The term rectum-colon is used because in most animals it is difficult to differentiate between the rectum and the colon, at least in the portions thereof adjacent to each other. While it is probably true that the iliac arteries and veins could be preserved by very careful removal of the bowels, this would involve too much detailed dissection, impractical on the slaughter floor.

The location and ligation or other blocking of the main arteries emerging from the aorta which have been cut, particularly those leading to the organs of the abdominal cavity, is another preliminary and necessary condition to achieve permeation of the fleshy parts of the carcass with injection fluids in an eviscerated animal.

Finally, careful consideration of the properties of the alimentary fats, and of the laws of hydrodynamics has permitted me to devise a method by which melted fatty substances may be injected under special pressure and temperature conditions into the carcass in such a way as to produce the desired marbelizing within essential meat cuts concomitant with the introduction of substantial quantities of fat into the meaty parts of the carcass.

The general method of this invention centers around four phases of procedure: (a) the general preparation of the animal for the injection; (b) special preparation of the animal according to the aims expressed in the above disclosure; (c) the actual injection procedure and (d) apparatus used and problems of temperature and pressure.

PHASE A OF THE METHOD—THE GENERAL PREPARATION OF THE FOOD ANIMAL

In the case of food animals such as cattle, sheep, goats or hogs, the animal is slaughtered essentially in the conventional manner, but necessarily with some consideration as to the extent of the wound inflicted for purposes of bleeding. In order to prevent mutilation of the neck arteries and veins, it is desirable that the carotids and the jugular veins be severed transversally, i. e., in the so-called kosher way, instead of longitudinally. This procedure enables the operator to prepare the neck vessels either for use as injection sites or to permit easier and more effective ligation thereof to prevent the escape of injection fluids. During this part of the process, the animal is suspended by its hind legs to facilitate bleeding. If no injection via the carotids is contemplated, ligatures are applied to the two carotid arteries and also to both the jugular veins when injection is being performed through the heart or the aorta. Ligatures and clamps may be applied loosely at first to permit some additional flushing of residual blood with the help of some of the injection fluids. If desired, a fluid other than the alimentary injection fluid may be used for flushing the residual blood prior to injection of the alimentary fat or other food substance. These ligatures can be fastened or tightened after the operator has assured himself that the injection is proceeding satisfactorily. The above enumerated steps can be modified as desired. The method of the invention depends on these steps only insofar as it is necessary to bleed the animal prior to the injection. It is obvious that care must be taken to avoid undue damage to those channels of the arterial system which are used subsequently for injection sites.

PHASE B OF THE METHOD

The special preparation of the animal for arterial injection procedure comprises the following steps:

1. *Preparation of the heart, aorta and of the main anterior trunks*

After severance of the head, the animal is placed on the floor, according to the usual procedures familiar in slaughterhouses, and skinned ventrally. While the hide will generally be removed, it is not necessary that this be done and, in fact, in many cases it is preferable that it be left on until after the injection is complete. It is important that the thoracic cavity be opened in such a way as not to injure the heart and particularly the brachio-cephalic trunk which can easily be mutilated if the butcher applies his saw carelessly. While the animal lies on the floor, it is preferable, but not necessary at this particular time, that the pericardium of the heart be opened and cut away in order to expose the whole of the heart with the two auricles and the pulmonary artery emerging from the right ventricle. For the purposes of the injection, it is important that the pulmonary artery be separated from the aorta which lies dorsally and directly beneath it. The tough connective tissue attachments uniting the pulmonary artery with the ascending aorta are somewhat difficult to dissect, but this is only an anatomical problem irrelevant to the method. It is also obvious that the pulmonary artery does not need to be severed from the aorta at this stage and the same effect of a separation of the pulmonary from the general aortic circulation can be achieved by ligature or by use of a special clamp. Great care should be exerted at this particular time to preserve the brachio-cephalic trunk and also the left sub-clavian artery which supplies the left forequarters. The above steps can be performed while the animal is lying on the floor or while it is hoisted. Whenever the animal is hoisted, it is convenient to remove the rest of the pericardium toward its dorsal aspect while the venous channels leading to the heart, i. e., the whole sinus venosus and also the pulmonary veins leading to the left auricle, are severed. This is done because there is no intention of injecting the lungs and the additional bulk of the anterior and of the posterior vena cava which collect all the systematic blood from the body. The preservation or, on the contrary, the removal, of the sinus venosus is, however, a matter of choice.

A delicate operation, in view of the necessary evisceration of the animal, consists in the removal of the trachea, the oesophagus and of the lungs, and it is evident that rupture of minor arterial vessels can not be avoided on the slaughter floor in this operation. The exact procedure for drawing the tubular trachea and the oesophagus through the maze of blood vessels within the most anteriorly situated cephalic pocket of the thoracic cavity is a matter of choice and of skill. This is a problem to be solved in collaboration with an anatomically skilled demonstrator and the individual butcher. Several different methods leading to identical and satisfactory results have been worked out.

If the heart is not removed at this time, it is preferable that the aorta remain attached thereto. The retention of the heart is not, however, an essential part of the procedure. It merely facilitates the injection by providing easier access to the aorta. If it is not desired that the heart be retained, then the aorta should be severed as near as possible to its point of emergence from the left ventricle at the level of the aortic valves. After this is done, the aorta is then protruding within the anterior portion of the thoracic cavity by a short undivided segment. This segment is the ascending aorta with the brachio-cephalic trunk and the left subclavian artery plainly visible. It should, of course, be understood that the dorsal aorta within the thoracic cavity should remain completely uninjured during the procedure of the removal of the lungs, the trachea, the bronchi, the oesophagus, the venous attachments and the pericardium.

2. *Preparation of the abdominal cavity*

This important step involves the opening of the abdominal wall, which may be performed by conventional methods, but without the splitting of the anterior pubic region. It must be understood, however, that even this latter step can be omitted without compromising too much the ultimate success of the operation. However, if the pubic symphysis is split, unnecessary leakages within the circulatory system result, thus demanding location of cut arteries and veins and the application of additional ligatures or clamps. The removal of the bulk of the viscera should await the special preparation of the rectum. Substantially the entire viscera, with the exception of the terminal portion of the uro-genital system in females, a portion of the rectum-colon and the anus will be removed subsequently. Preferably, about a one foot length of the uterus and vagina is preserved when a female animal is being processed. When a pregnant female is being processed, however, this portion of the uro-genital system is preferably removed.

3. *The preparation of the rectum-colon*

(a) The butcher should seize the rectum and strip it several times vigorously downward (and cephalad) in order to displace any fecal matters therein toward that region of the colon which will be severed from it presently and which will remain attached to the rest of the bowels when these are removed from the body.

(b) A double ligature with strong string or the like should be applied to the portion of the rectum-colon which is to remain temporarily within the body and a similar ligature should be applied to the portion thereof which is to be removed at once. These ligatures will be preferably about 2 or 3 inches apart so as not to create any subsequent difficulties in handling and in the severance of the portion situated between the ligatures.

(c) The supporting mesenteries attaching the terminal portions of the intestine including part of the colon are then carefully dissected dorsally from the rectum-colon and the loop of intestines thus freed is drawn toward the operator so as to make it protrude outside of the body cavity;

(d) The rectum-colon is severed between the two ligatures and the distal portion of the severed and likewise ligated rectum-colon is made to fall on the outside of the animal with the rest of the intestines so as to avoid any possible contamination of the inner cavity of the carcass. The point of severance of the rectum-colon may be any convenient distance from the anus, but preferably is located about 12 to 16 inches therefrom.

(e) A protective covering is preferably applied to the severed and duly ligated portion of the rectum which remains temporarily within the carcass so as to avoid any possibility of extrusion of fecal matters into the body cavity, unlikely as this might appear after conscientious performance of the above described stripping procedures. There are many types of caps or coverings which may be employed. The sole purpose of the cap is to render the operation of severing the rectum safe from a public health standpoint. The cap will be secured by an additional ligature over the rectal stump while the cut portion of the rectum is held outside of the body cavity.

It is evident that the non-splitting of the pubis, the preservation of a portion of the rectum-colon, of the anus, and of the terminal portion of the uro-genital system in females, are all measures connected with the preservation of the arterial and the emerging part of the venous network of the lumbo-sacral and pelvic regions. They may, therefore, with the exception of the non-splitting of the pubic symphysis, which operation may be omitted, be considered as steps of the injection process itself. But, the special ligatures applied to the rectum-colon, the severance of the portion situated in-between the ligatures and the capping of the portion of the rectum remaining temporarily within the carcass are solely measures dictated by considerations of hygiene and public health.

4. *Emptying the abdominal cavity*

After the severance of the now securely capped rectum, the removal of the rest of the contents of the abdominal cavity can begin. The portion of the rectum-colon which is not still attached to the anus, the large intestine, the small intestine, the whole bulk of the stomach, and, in males, the external genitalia, are now removed in the usual manner with, however, special precautions involving the mesenteries by which the bowels are attached to the back. These precautions comprise not cutting them too near the aorta so that the enclosed arteries may be conveniently blocked by ligation or otherwise. Special attention must be taken not to injure the aorta, and care must also be taken not to damage the large intestinal arteries. Moreover, when the enormous bulk of the stomach is detached together with the appended oesophagus, special precaution should be taken not to section the common coeliac artery too short, a condition which would render the subsequent ligation of this important stem for a whole bundle of visceral arteries very difficult. According to the practices prevailing in slaughterhouses, the liver is detached separately from the bowels and here again there are some anatomical considerations involved. The details of the severance of the liver are of a purely technical nature that do not concern the principle of the injection involved. It will suffice to state that at this particular step it is easily possible to injure the aorta and the common coeliac artery with its three main visceral branches, a situation which will interfere with the subsequent injection.

5. *Final preparation for injection*

At this time the first ligatures or clamping of the main severed arteries leading to the removed bowels should be applied. It should be understood, however, that some of these openings will be discovered only after the injection procedures are begun. Special preparation of the pelvic portion of the vena cava is desirable. This vessel collects all the blood from the lumbo-sacral region and also from the hindquarters. It is preferable, although not absolutely necessary, to provide control of the backflow in this large vessel by applying thereto first a temporarily half-open ligature which will permit a more complete flushing of remaining blood masses after the beginning of the injection. Subsequently, a tight ligature may be applied to that blood vessel since it then communicates with only the fleshy parts of the carcass and not with the visceral portions thereof.

PHASE C OF THE METHOD—ACTUAL INJECTION PROCEDURE

The animal, which may be either suspended by its limbs or disposed horizontally, is now ready for injection. The actual injection procedures are based essentially on the foregoing considerations concerning the properties of the peripheral arteries. Several injection sites such as the carotids, the brachio-cephalic trunk or the iliac arteries can be and have been used with satisfactory results. It is preferable, however, to utilize the dorsal aorta since this vessel can be reached centrally according to the procedure to be set forth. There are three principal approaches which will give satisfactory results:

1. *Injection through the carotid arteries*

It is possible to inject the animal through one carotid only or simultaneously through both the left and right carotids. In order to produce the best results, the animal is preferably suspended by its forelimbs to take advantage of the gravitational forces. But this is by no means necessary if an apparatus with sufficient pressure is available. If one carotid only is used for the injection, it is obvious that the other carotid should be strongly ligated. Another prerequisite of the operation is the ligation of the ascending aorta if the heart has been removed, since in that case the aorta is now wide open. If the heart was preserved, the left ventricle of the heart will serve as a reservoir and the injection fluids, after filling the cavity of the left ventricle, will mount from the ascending aorta into the brachio-cephalic system, into the left subclavian artery and into the whole aortic system thereby permeating the rest of the carcass. While feasible, this method has the disadvantage of introducing large quantities of fluids through channels of a smaller bore than the main distributing channel, namely the aorta.

2. Injection through the iliac arteries

The insertion of the cannula can be made either through one of the iliac arteries, internal or external, from the left or the right side of the body or in the region of the shank by means of a femoral artery or even lower, through one of the tibial or peroneal arteries. These latter procedures involve special dissections and generally demand the cutting open of sizable pieces of flesh, but adequate results in using these methods can be and have been achieved. It must also be considered that in this case the injection of the other parts of the body proceeds in the reverse direction, i. e., in the direction of the heart instead of away from it.

The procedure of injection of liquid substances through the iliac arteries involves, therefore, a double operation: in a first step the cannulae are inserted in one or in both of the iliac arteries or in one or both femoral arteries to cause the injection fluids to follow the normal direction of the blood stream, i. e., from center to the periphery; in a second step the cannula will be reinserted into the same vessels or into the lower aorta in such a way as to point in the direction of the head of the animal. In other words, the injection of the carcass, if performed through the iliac arteries, involves injection of food stuffs in two opposite directions—one downward and caudal for the permeation of the rump and the lower extremities, the other upward and toward the head for the perfusion of the loin, the whole back region, chest, neck and the upper extremities. This is one of the reasons why this approach is not preferred.

3. Injection through the heart

If the heart is not removed, injection can be effected therethrough. An incision is made within the walls of the left ventricle and the nozzle of the injection tube is directed upward in such a way as to avoid the bicuspid valves. The nozzle is pushed through the aortic valves and its enlarged terminal portion should reach the portion of the aorta generally termed the ascending aorta. The nozzle thus communicates with that portion of the aorta which is undivided and which, therefore, commands the brachio-cephalic trunk, the dorsal aorta proper and obviously also the left subclavian artery with all the other intercostal, vertebral, visceral and iliac arteries.

4. Injection into the aorta after the removal of the heart

This particular method, i. e., injection into the aorta with the heart removed, differs but little from the previous one. However, the ascending aorta should be carefully prepared. This short piece of the aorta should be secured very tightly in order to withstand the pressure applied through the nozzle. Care must also be taken that the brachio-cephalic trunk receives adequate injection. Instead of injecting the fat into the ascending aorta, the injection may be made into that portion of the aorta generally termed the descending aorta. In this case, the injection is preferably made at a point in the descending aorta more remote from the heart than the emergence from the aorta of the left brachial artery.

In all the injections through the heart or directly into the aorta or through the carotids or via the arteries of the hindquarters, an additional precaution concerned with adequate permeation is desirable. Since, as explained above, the large arterial vessels can be expanded considerably and can accumulate large amounts of potential energy, this property can be taken advantage of in securing better sectional permeation. Indeed, I have found that by specially preparing three or more places along the aorta, excellent regional permeation along the longitudinal axis of the body can be obtained in several separate operations. The placing of a temporary clamp or a temporary blocking by any other suitable device will produce, after application of pressure, a substantial swelling between the point of entrance of the nozzle and the blocked portion of the aorta. After the pressure in the injection apparatus is reduced, the accumulated potential energy in the aorta or in the brachio-cephalic trunk will serve to propel the accumulated injection liquids therein into the areas which are supplied by these vessels.

This aspect of my process involves selecting one or more points along the aorta and the iliac arteries which are to be blocked. When a selected point along the artery has been blocked, injection is commenced as described above. Sufficient fluid is injected to cause the artery to swell between the point of injection and the blocked point. After the artery has been filled to the desired degree, pressure is reduced. As described above, the artery will then contract, forcing injection fluid into the smallest capillaries communicating with the blocked artery between the point of injection and the blocked point. Of course, substantial permeation of the capillaries takes place while the artery is being filled. When permeation of the selected area of the carcass is complete, the clamp or blocking is removed. The remainder of the carcass may then be filled by further injection or the clamp or blockage may be applied to another point farther away from the point of injection than the original blockage point. If the latter procedure is used, the application of pressure to fill the artery and the subsequent reduction of pressure may be carried out in the same manner as described with respect to the first blockage. Subsequent blockage steps may be employed, and each will be carried out in the same way. I have found that much better permeation of most meaty parts of the carcass is achieved by this division thereof into sections which are individually filled. By dividing the body into sections and individually filling the sections under pressure, as described, relatively small capillaries which would not be filled because of shunting effects will be suitably filled with injection fluid. These shunting effects may result from various causes, such as clogging of capillaries by tissue particles, local cooling, local pressure blocks, early rigor mortis and differences in capillary size.

Any number of these regional blocking areas can be selected at the will of the operator. I have found it preferable to separately and consecutively inject four particular portions of the carcass: (a) First the anterior part of the body is selected. The aorta should be blocked at the general level of the fourth or fifth rib. In this case, the injection nozzle may be inserted either in one or both carotids, into the heart or into the ascending aorta. (b) After completion of this step, a second temporary clamp or a blockage by any other means is applied on the aorta in the general area of the diaphragm, thereby producing substantially complete permeation of all the intercostal muscles. After the inflated aorta has visibly deflated itself, after a reduction in injection pressure, permeation of those parts of the body communicating with this section of the aorta will be substantially completed. The operator should supply fluid pressure to keep the aorta filled until he judges that enough fluid has been provided to achieve the desired permeation. (c) A particularly advantageous and important third control area is provided by clamping the aorta in the sacral region which supplies the important lumbo sacral area of the body. After the clamp has been applied to the aorta in this region, the operator applies pressure to fill this section of the aorta with sufficient fluid to provide substantially complete permeation of the lumbo sacral area. After the operator reduces the pressure, contraction of the aorta will complete the desired permeation of this portion of the body. (d) A final area to be localized and permeated is selected by separately clamping the iliac arteries on both sides of the body, thus insuring proper permeation of the important and bulky rump region and also the region of the hind legs. The application of pressure to fill these arteries and to supply fluid to the corresponding portions of the body and the subsequent release of pressure may be carried out in the same way as applied to the other sections of the body.

It should be understood that the local and selective permeation may follow an overall permeation, may be followed by an overall permeation, or both, or may be effected without an overall permeation step. The local and sectional permeation steps may, if desired, be omitted. In effecting the sectional permeation, it is preferable to employ only a single injection site.

The position of the animal during the injection procedure is a matter of choice. For example, the animal can either (a) be suspended by the hind legs; (b) be hoisted by the fore legs; (c) lie horizontally on a suitable supporting surface. The latter solution presents advantages, the chief one residing in the fact that the position of the injection apparatus in relation to the injection site need not be varied. This latter method provides the additional advantage of permitting better control over the inevitable channels of escape of injection fluids through severed arteries emerging from the aorta, which will become apparent after the beginning of the injection procedures. It is preferable that the initial injection pressure be relatively low. The purpose of using a low initial pressure is to permit discovery of the main channels of escape from the severed arteries which supply the various organs. When located, these arteries have to be ligated or clamped off with hemostatic devices or with other suitable clamps capable of withstanding considerable pressure.

It is essential that the injection pressure be applied for a time sufficiently long to permit the filling of the vascular network and also of the returning veins which are actually located within the meat parts of the animal and not in the viscera. It is, in addition, important to clamp off or ligate the portion of the vena cava in the pelvic region as it emerges from the ischiatic region. This portion can easily be found and secured with a strong clamp thus creating a closed circuit within that limited area. Similar clamping should also be performed in the anterior or thoracic region for the main jugular and brachial veins.

Before the nozzle is withdrawn, the main injection site should be blocked by tying, clamping, or, if desired, by freezing the opened end of the artery to prevent the escape of the substances so introduced into the body. While it is not absolutely necessary to tie or otherwise block the proximal portion of the injection artery, omission of this step is both undesirable and wasteful. As a further step in the procedure, the animal should now be chilled for as long a time as feasible within the practices of slaughterhouses. It is also highly desirable that cold water be sprayed upon the aorta so as to produce hardening of the injection fluid within this channel, this being particularly important before splitting of the carcass is effected. This ends the actual injection procedures and the next steps, such as the removal of the heart, if not done before, of the remaining portion of the rectum-colon, the anus, and of the terminal portion of the uro-genital system, of the dorsal aorta and the other blood vessels protruding from the carcass and, of course, also the splitting of the carcass are steps to complete the usual dressing procedures.

PHASE D OF THE METHOD—APPARATUS USED AND PROBLEMS OF TEMPERATURE AND PRESSURE

The apparatus used will generally comprise a tank containing the injection fluids which are kept under substantially constant temperature conditions. The contents of the tank may be conveyed through a flexible hose which is supplied with either a pump or any other device permitting the liquid to be conveyed into the injection nozzle under a desired pressure. Alternatively, the liquid could be maintained under suitable pressure conditions in a tank equipped with pressure control devices.

The nozzle employed will vary in size depending upon whether it is inserted into the aorta, into the carotids, into the brachio-cephalic trunk, into a subclavian artery or into branches of the iliac and femoral arterial systems. It is preferably enlarged at its terminal portion in order to facilitate fastening thereof within slippery vessels to withstand pressure and recoil during injection procedures.

Suitable clamps should be employed to hold the injection nozzle in place. However, ligatures with strong string, although more laborious and time consuming, will achieve satisfactory results.

Problems of temperature

It is evident that the injection fluid, which consists of melted fats, should be injected at a temperature which will facilitate and secure the most complete permeation of the tissue of the food animal. The fats employed should have a melting point above about 75° F. so that they will be solid in the final meat product at normal room temperatures. If the food substances injected are vegetable fats, then a temperature within the range of about 100° to 110° F. is preferred. When, however, beef tallow, other animal fats or the like are being injected, then it is obvious that at the body temperature, around 100° F., the fat is still much too viscous. For the injection, therefore, of beef tallow or the like into the carcasses of food animals, temperatures within the range of about 110° to 150° F. are preferred. Some fats, such as those having a stearinic fraction, have relatively high melting temperatures, such as about 120° F. Obviously, the injection temperature should not be below the melting temperature even though the temperature of solidification is lower than the melting temperature, as is the case with beef fats. The choice of the temperature at which an animal is being injected depends upon the melting point and the viscosity of the fat used and also on the temperature of the animal to be injected. The temperature of the animal depends upon the length of time it has been dead and the type of animals, i. e., cattle, sheep, hogs, calves or the like. Larger animals, i. e., those weighing over about 400 pounds, such as full grown cattle, will obviously cool off more slowly than smaller animals. If conditions are most propitious and the animal is ready for injection within a relatively short time, such as about 30 minutes after slaughter, then the carcass, being still at a temperature close to normal body temperature, can be advantageously injected with fats kept within the range of about 110° to 120° F., if the stearinic fraction is not present in the fat. If the preparation of the animal has been delayed and the animal has been cooling off for some time so that its temperature is somewhat below normal body temperature, or with a warm animal if the fat has a relatively high melting point, then a temperature within the range of about 120° to 135° F. is preferable. If the slaughter floor is cold or if the animal has been cooling off for so long that the carcass is well below body temperature, then a fluid injection temperature within the range of about 135° to 150° F. is preferable. Higher temperatures can be used, but there is considerable likelihood that they will damage, or at least cook, the tissues if they reach temperatures as high as about 160° F. Injection should be carried out within three and preferably within one hour after death.

The foregoing preferred temperature ranges, which are intended for large animals such as full grown cattle, are not intended to be rigid since obviously the optimum temperature will tend to vary with varying injection pressures and with the viscosity of the injected fat. Smaller animals such as calves, goats and sheep, weighing less than about 400 pounds, cool off more rapidly than larger animals. For such smaller animals, satisfactory results can generally be achieved with temperatures of about 110° to 120° F. during about the first thirty minutes after death, temperatures of about 120° to 130° F. during about the first hour after death, and temperatures of about 130° to 150° F. for anything over an hour after death. Again, the optimum temperature will tend to vary with a number of factors so that these ranges and times are not intended to be exclusive but are merely given as examples of suitable practical values. The lowest practical temperature will, of course, depend on the melting point of the fat used.

Problems of pressure

To convey viscous fluids into the finest capillaries amidst the dense tissues of a cooling animal requires considerable pressure. It was found that pressures of the order of 5 pounds, at the injection site, if not otherwise aided by gravitational forces in the suspended animal, are clearly insufficient to produce satisfactory results in large animals such as full grown cattle. It is necessary, in order to permit adequate permeation of the tissues, particularly of older and tougher large animals, to apply pressures which are above 10 pounds and preferably within the range of about 20 to 30 pounds per square inch at the site of the injection. A pressure lying within the range of about 15 to 30 pounds per square inch at the site of the injection has been found generally satisfactory empirically. The pressure required is, of course, dependent on the temperature and viscosity of injection fluid and the animal body temperature. A lower fluid pressure is required for higher injection and body temperatures, and vice versa. If insufficient pressure is applied or if the fluids are too viscous, the injected fat will enter the paths of the larger blood vessels and avoid the more tenuous and pressure resisting smaller vessels, especially the arterial and venous capillaries, thus creating undesirable inequalities in permeation. For the smaller animals, i. e., those weighing less than about 400 pounds, injection pressures lying within the range of about 5 to 12 pounds per square inch at the site of the injection will generally produce satisfactory permeation.

My new method of conveying food stuffs into the edible, and substantially only into the edible parts of the eviscerated carcass of meat animals such as cattle, goats, sheep and hogs, makes use of the remarkable anatomical and physiological properties of the large arteries of the mammalian body, thus providing a practical and industrially convenient approach to the important problem of processing meat directly on the slaughter floor. The method presents several substantial advantages over the previously devised ones: (1) It satisfies the requirements of the animal inspection laws. The modifications in slaughtering procedure proposed lie within the law because they do not interfere either with the inspection of the viscera, since this is removed from the body before the injection, nor with the detection of pathological conditions within the unsplit carcasses, since these can be examined before the injection procedures begin. (2) My method avoids the passage of hot injection fats over large areas of the viscera with their mesenteries, particularly of the large intestine, where the fats tend to acquire an unpleasant gutty odor and taste. (3) My method avoids the disadvantage inherent in the previous methods of injecting large quantities of valuable food stuffs into the blood vascular channels of the alimentary canal, the vast mesenteries of the abdominal cavity and the tenuous passages of the lungs. These channels, because of their location within the soft tissues of the body and because of their thin and extensible walls, can absorb considerable volumes of the liquid, a highly uneconomical condition over which the operator has no control if injection is performed into an animal with the viscera intact. (4) My method of injection of eviscerated carcasses permits the application of much higher injection pressures, thereby enabling the operator to inject appreciable amounts of food stuffs into the more resisting, meaty portions of the carcass. The meat product so obtained is desirable from the consumers' point of view because it provides an enriched and otherwise improved product; it becomes consequently advantageous for the meat packer because of the substantial increase in weight and quality of the carcass. (5) Finally, my new method of injecting the carcasses of mammals after evisceration has the advantage of visual control over the previous methods devised. The operator can detect leakages from severed and ruptured vessels, and promptly tie or clamp these off. Instead of operating blindly, as in prior methods, the operator, with the animal in full sight, can judge the effect of the injection, the amounts of food stuffs within the carcass and the areas deserving special attention.

The meat product produced by practicing my method, as described herein, is a more palatable and more valuable product than those produced by prior methods. More particularly, the method of my invention achieves more complete permeation of the smaller channels of the circulatory system. Furthermore, the meat product secured in accordance with my invention does not have the undesirable taste and odor characteristics which frequently result from the prior art processes.

While my invention has been described in connection with specific steps, it should be understood that various modifications thereof will occur to those skilled in the art without departing from the spirit and scope of the invention as set forth in the appended claims.

What I claim is:

1. The method of treating food animals, after slaughter and while the animal is still warm, to improve the quality of the meat, which comprises the steps of bleeding the animal, removing at least the portions of the viscera within the abdominal cavity from the animal, the removal of the viscera being carried out in such a manner as to protect from substantial damage the arteries supplying blood to the viscera, blocking said arteries, and introducing under pressure into a major artery of the animal a melted edible fat which has a melting point above 75° F., said major artery being selected from the group consisting of the aorta, the carotid arteries, the iliac arteries, the femoral arteries and the brachial arteries, said introduction being carried out under sufficient pressure to cause said fat to infuse and permeate a substantial portion of the carcass.

2. The method of treating food animals, after slaughter and while the animal is still warm, to improve the quality of the meat, which comprises the steps of bleeding the animal, removing at least the portions of the viscera contained within the abdominal cavity from the animal with the exception of the terminal portion of the uro-genital system in female animals, and a portion of the rectum-colon including the anus, the removal of the viscera being carried out in such a manner as to protect from substantial damage the arteries supplying blood to the viscera, blocking said arteries, and introducing under pressure into a major artery of the animal, a melted edible fat having a melting point above 75° F., said introduction being carried out under sufficient pressure to cause said fat to infuse and permeate a substantial portion of the carcass.

3. The method of treating food animals, after slaughter and while the animal is still warm, to improve the quality of the meat, which comprises the steps of bleeding the animal, opening the abdominal wall of the animal, displacing fecal matters in the rectum-colon toward the colon, severing the rectum-colon at a point substantially free of fecal matter, removing at least the portions of the viscera contained within the abdominal cavity from the animal with the exception of the severed portion of the rectum-colon adjacent to the anus, the anus, and, in females, the terminal portion of the uro-genital system, the removal of the viscera being carried out in such a manner as to protect from substantial damage the arteries supplying blood to the viscera, blocking said arteries, and injecting a melted edible fat having a melting point above 75° F. into a major artery of the animal, said injection being carried out under sufficient pressure to cause said fat to infuse and permeate a substantial portion of the carcass.

4. The method of treating food animals, after slaughter and while the animal is still warm, to improve the quality of desired meaty portions of the carcass, which comprises the steps of bleeding the animal, removing the viscera from the animal with the exception of a terminal portion of the rectum-colon, the anus, and, in females, a terminal portion of the uro-genital system, the removal of the viscera being carried out in such a manner as to protect from substantial damage the arteries supplying blood to the viscera, blocking said arteries, blocking a major artery supplying blood to the meaty portions of the carcass at a point remote from the heart, injecting a melted edible fat having a melting point above 75° F. into said major artery at a point nearer the heart than said blocked point thereof, said injection being carried out under sufficient pressure to expand said major artery between the point of injection and the blocked point and to cause said fat to infuse and permeate the desired portions of the carcass having blood channels communicating with said major artery between the point of injection and the blocked point.

5. The method of treating food animals, after slaughter and while the animal is still warm, to improve the quality of desired portions of the meat, which comprises the steps of bleeding the animal, removing the viscera from the animal with the exception of a terminal portion of the rectum-colon, the anus and, in females, a terminal portion of the uro-genital system, the removal of the viscera being carried out in such a manner as to protect from substantial damage the arteries supplying blood to the viscera, blocking said arteries, blocking the aorta at selected spaced points thereof remote from the heart, introducing under pressure into the sections of the aorta between the heart and the nearest blocked point and between adjacent blocked points a melted edible fat which has a melting point above 75° F., said introduction being carried out under sufficient pressure to expand said sections of the aorta and to cause said fat to infuse and permeate the desired portions of the carcass having blood channels communicating with the aorta along said sections thereof.

6. The method of treating food animals, after slaughter and while the animal is still warm, to improve the quality of desired portions of the meat, which comprises the steps of bleeding the animal, removing the viscera from the animal with the exception of a portion of the rectum-colon, the anus and, in females, a terminal portion of the uro-genital system, the removal of the viscera being carried out in such a manner as to protect from substantial damage the arteries supplying blood to the viscera, blocking said arteries, blocking the aorta adjacent one of the thoracic ribs, adjacent the diaphragm and at a point in the sacral region and blocking the iliac arteries at intermediate points thereon, introducing under pressure into the sections of the aorta and the iliac arteries defined by said blockages a melted edible fat which has a melting point above 75° F., said introduction being carried out under sufficient pressure to expand said sections of the aorta and the iliac arteries and to cause said fat to infuse and permeate the desired portions of the carcass having blood channels communicating with said sections of the aorta and the iliac arteries.

7. The method of treating food animals, after slaughter and while the animal is still warm, to improve the quality of desired portions of the meat, which comprises the steps of bleeding the animal, removing the viscera from the animal with the exception of a terminal portion of the rectum-colon, the anus and, in females, a terminal portion of the uro-genital system, the removal of the viscera being carried out in such a manner as to protect from substantial damage the arteries supplying blood to the viscera, blocking said arteries, blocking at a plurality of spaced points at least one artery selected from the group consisting of the aorta, the carotid arteries and the iliac arteries, introducing under pressure into the sections of said one artery defined by said blocked points a melted animal fat which has a melting point above 75° F., said introduction being carried out under sufficient pressure to expand said sections of said one artery and to cause said fat to infuse and permeate the desired portions of the carcass having blood channels communicating with said sections.

References Cited in the file of this patent

UNITED STATES PATENTS 2,516,923    Schotte _____ Aug. 1, 1950